US007872207B2

(12) United States Patent
Bijker et al.

(10) Patent No.: US 7,872,207 B2
(45) Date of Patent: Jan. 18, 2011

(54) CASCADE SOURCE AND A METHOD FOR CONTROLLING THE CASCADE SOURCE

(75) Inventors: Martin D. Bijker, Helmond (NL); Leonardus P. M. Clijsen, Eindhoven (NL); Franciscus C. Dings, Veldhoven (NL); Remco L. J. R. Pennings, Eindhoven (NL)

(73) Assignee: OTB Solar B.V., Eindhoven (NL)

( * ) Notice: Subject to any disclaimer, the term of this patent is extended or adjusted under 35 U.S.C. 154(b) by 1134 days.

(21) Appl. No.: 10/557,043

(22) PCT Filed: May 19, 2004

(86) PCT No.: PCT/NL2004/000348

§ 371 (c)(1), (2), (4) Date: Aug. 11, 2006

(87) PCT Pub. No.: WO2004/105450

PCT Pub. Date: Dec. 2, 2004

(65) Prior Publication Data

US 2006/0292891 A1 Dec. 28, 2006

(30) Foreign Application Priority Data

May 21, 2003 (NL) .................................... 1023491

(51) Int. Cl.
*B23K 10/00* (2006.01)

(52) U.S. Cl. ............................ 219/121.48; 219/121.52; 219/121.59; 315/111.21; 313/231.41

(58) Field of Classification Search ............ 219/121.52, 219/121.48, 121.39, 121.45, 74, 75, 121.59; 313/231.31, 231.41; 315/111.21, 111.51
See application file for complete search history.

(56) References Cited

U.S. PATENT DOCUMENTS

| | | | |
|---|---|---|---|
| 3,501,665 | A | 3/1970 | Rotger et al. |
| 3,953,705 | A | 4/1976 | Painter |
| 4,367,393 | A | 1/1983 | Yerushalmy |
| 4,484,059 | A | 11/1984 | Lillquist |
| 4,488,032 | A | 12/1984 | Case, Jr. |

(Continued)

FOREIGN PATENT DOCUMENTS

EP 0 249 238 A2 12/1987

(Continued)

*Primary Examiner*—Mark H Paschall
(74) *Attorney, Agent, or Firm*—Pillsbury Winthrop Shaw Pittman LLP

(57) ABSTRACT

A cascade source includes a cathode housing, a number of cascade plates insulated from each other and stacked on top of each other which together bound at least one plasma channel, and an anode plate provided with an outflow opening connecting to the plasma channel. One cathode is provided per plasma channel, which cathode includes an electrode which is adjustable relative to the cathode housing in the direction of the plasma channel. The clamp may be of the collet chuck type. At least a part of the housing of the source may be substantially transparent. A method for controlling the cascade source in use includes monitoring the electromagnetic radiation of the plasma through the substantially transparent housing part, and, dependent on the monitored radiation, controlling the plasma forming process in the source by variation of the gas supply, or variation of the potential difference between the cathode and the anode or a combination thereof.

32 Claims, 4 Drawing Sheets

U.S. PATENT DOCUMENTS

| | | | |
|---|---|---|---|
| 4,656,331 | A | 4/1987 | Lillquist et al. |
| 4,780,591 | A | 10/1988 | Bernecki |
| 4,788,408 | A | 11/1988 | Wlodarczyk et al. |
| 4,957,062 | A | 9/1990 | Schuurmans et al. |

FOREIGN PATENT DOCUMENTS

| | | | |
|---|---|---|---|
| EP | 0 289 961 | A2 | 11/1988 |
| EP | 0474 899 | A1 | 3/1992 |
| EP | 501 277 | | 9/1992 |
| JP | 56-100899 | U | 12/1954 |
| JP | 56-100900 | U | 12/1954 |
| JP | 52-139645 | | 11/1977 |
| JP | 58-212873 | | 12/1983 |
| JP | 59-47067 | | 3/1984 |
| JP | 63-40300 | | 2/1988 |
| JP | 2-87564 | | 7/1990 |
| JP | 5-13195 | | 1/1993 |
| JP | 5-255831 | A | 10/1993 |
| JP | 8-17573 | A | 1/1996 |

CASCADE SOURCE AND A METHOD FOR CONTROLLING THE CASCADE SOURCE

CROSS REFERENCE TO RELATED APPLICATIONS

This application is the National Phase of PCT/NL2004/000348, filed May 19, 2004, which claimed priority to Netherlands Application 1023491, filed May 21, 2003, the entire contents of both of which are incorporated herein by reference.

BACKGROUND OF THE INVENTION

1. Field of the Invention

The present invention relates to a cascade source and a method for controlling the cascade source.

2. Description of the Related Art

A cascade source is known from practice. The original cascade source was invented by Maecker in 1956. Subsequently, an argon plasma source was developed from this by Kroesen et al. The known cascade source is provided with a copper cathode housing and three cathodes provided with 0 tungsten tips reaching into the cathode housing. In the known apparatus, the cascade plates are manufactured from copper and contain cooling channels through which water can be led for cooling cascade plates.

Between each two copper plates stacked on top of each other, an O-ring, an insulation plate of, for instance, PVC and a boron nitride plate are present which together provide vacuum sealing and electrical insulation. The plasma arc extends between the tips of the cathodes and the outflow opening of the anode. In general, the cascade source is connected to a process chamber in which a strongly reduced pressure prevails. Into the cathode housing, a fluid is supplied under higher pressure. This fluid flows from the cathode housing via the plasma channel to the process chamber at a high speed. As a result of this gas flow, the plasma extends far into the process chamber, so that it is active there.

In the known cascade source, the three cathodes are all insulated with respect to the copper cathode housing. Because the distance between the conductive cathode housing and the electrode tips of the cathodes is very small, in the known source, there is a considerable chance that, during the ignition of the plasma, for a short time, disruptive discharge takes place between the electrode tip and the cathode housing. Such a disruptive discharge is accompanied by sputtering of the electrode tip, which considerably shortens the life of the electrode tip. In addition, as a result of the sputtering, copper or electrode material can end up in the processing environment, which can have disastrous consequences for the substrate to be treated in the process chamber. Thus, in the known source, the cathodes had to be replaced regularly. The replacement of the cathodes and the subsequent repositioning of the electrode tip in the cathode housing is, in the known apparatus, a time-consuming and difficult job. This is inter alia caused by the fact that, when demounting the cathode housing, the mutual connection between the cascade plates was also lost.

SUMMARY OF THE INVENTION

The present invention contemplates a cascade source of which different aspects have been improved, so that it is better industrially applicable.

For this purpose, according to the invention, the cascade source of the type described in the opening paragraph is characterized by one cathode per plasma channel, which cathode comprises an electrode which is adjustable relative to the cathode housing in the direction of the plasma channel.

The positioning of the tip of the preferably rod-shaped electrode can simply be effected in that the electrode is adjustable relative to the cathode housing in the direction of the plasma channel.

According to a further elaboration of the invention, it is particularly favorable when the electrode is a standard welding electrode.

Because the electrode is designed as a standard welding electrode, it is available anywhere in the world. The design of the source can be constructed such that the standard electrode, for instance a TIG welding electrode, can be used directly without adjustments. Such an electrode is resistant to higher amperages than the electrodes in the cascade arcs hitherto known, for which known arcs, the electrode tips needed to be specially manufactured. The standard welding electrodes are not only particularly advantageous as far as purchase is concerned, but, moreover, have a considerably longer life. Moreover, the maintenance is very simple. By only grinding the point of the standard welding electrode, the welding electrode can be deployed again.

According to a further elaboration of the invention, the cathode housing is connected to an electrode housing with a clamping provision for adjustably attaching the electrode.

The fact that a separate cathode housing is provided which is connected to an electrode housing with a clamping provision yields more freedom of choice with regard to the choice of material of the electrode housing and the cathode housing. The electrode housing with the clamping provision is to transmit forces to the electrode for the clamping thereof. In addition, the material of the electrode housing needs to be suitable to dissipate heat generated in the electrode.

According to a further elaboration of the invention, it is particularly favorable when the material from which the cathode housing is manufactured is a non-conductive material. This offers the advantage that the tip of the electrode can be positioned at a distance from other metal parts. In the known cascade source, the electrode tips were located near the walls of a copper cathode housing. Under certain pressure conditions, in particular when starting the process, in the known source, it regularly occurred that a disruptive discharge took place between an electrode tip and the cathode housing. Such a disruptive discharge is accompanied by sputtering of the electrode tip, which considerably shortens the life of the electrode tip. Also, sometimes, as a result of the disruptive discharge, copper ended up in the processing environment, which, with some substrates, led to destruction of the process result.

In order to minimize the chance of disruptive discharge, according to a further elaboration of the invention, the electrode tip is located near the bottom side of the insulating cathode housing, the electrode housing with the clamping provision is located near a top side of the insulating cathode housing, and the electrode extends through an electrode channel extending in the insulating cathode housing. Thus, in such a design, it will not occur that the electrode fuses to the clamping provision as a result of disruptive discharge.

In order to, moreover, always maintain the gas pressure gradient in the electrode channel unfavorable for disruptive discharge during the starting up and the normal use of the source, according to a further elaboration of the invention, it is preferred that the diameter of the electrode channel is only slightly larger than the diameter of the electrode.

According to a further elaboration of the invention, the non-conductive material may be ceramic.

According to an alternative further elaboration of the invention, the non-conductive material may be quartz. Quartz has the fine property of being transparent and thus offers the possibility to visually inspect the electrode. Not only can the position and the condition of the electrode tip be inspected, but it can also be observed in one glance whether the plasma has been ignited or not.

In a further elaboration of the invention, on the cathode housing from quartz, at least one sensor can be provided. This can, for instance, be an optical sensor system which measures spectral lines in the plasma. Here, the signals from the sensor can be led to a control for adjusting the process, for instance by variation of the gas supply, or variation of the potential difference between the cathode and the anode. On the other hand, it is also possible to realize a process protection on the basis of the signals observed. By means of optical emission spectroscopy (OES), even a chemical analysis of the plasma formed in the cathode housing can be carried out.

Preferably, the clamping provision is of the collet chuck type. A clamping provision of the collet chuck type is understood to mean a clamping provision provided with a clamping sleeve provided with a number of longitudinal slots over a part of the length of the sleeve, such that the wall parts of the sleeve bounded by the longitudinal slots can be slightly pressed towards each other. Here, the outside of the sleeve will comprise a conical part which can be pressed into a conical cavity, so that, when it is pressed into this cavity, the wall parts are pressed towards each other. The inner space bounded by the wall parts, i.e. the channel bounded by the sleeve, is thereby narrowed. Thus, when an electrode is present in the sleeve channel, it is fixed, or clamped as a result of the narrowing of the channel. By loosening the pressure force of the sleeve in the conical cavity, which can, for instance, take place by loosening a retaining nut, the narrowing of the sleeve channel is cancelled as a result of the elasticity of the sleeve material and the electrode is movable in a longitudinal direction. The advantage of such a clamping is that the electrode is always centered with respect to the clamping sleeve, which clamping sleeve is in turn centered with respect to the electrode housing. It is thus achieved in a simple manner that the electrode extends centrally in the electrode channel. The longitudinal slots in the sleeve further provide the possibility to supply gas via these longitudinal slots to the electrode channel. The gas can consist of just the ignition gas of the plasma, but may also contain a reaction gas. Besides, in addition to the longitudinal slots, extra gas channels can be provided for the supply of gas to the electrode channel. It can thus be achieved that an optimum cooling of the clamping sleeve and therefore of the electrode is obtained. Since the sleeve is preferably manufactured from metal, it can also serve as power supply to the electrode. The function of the clamping sleeve of the collet chuck type is thus threefold:

centered clamping of the electrode power supply to the electrode cooling of the electrode.

The invention also relates to a method for controlling a cascade source according to the invention, especially a cascade source which is provided with a quartz cathode housing or a substantially transparent housing part which provides the possibility of inspecting the plasma in the source. In the method according to the invention, the electromagnetic radiation of the plasma is monitored through the substantially transparent housing part, wherein, dependent on the monitored radiation, the plasma forming process in the source is controlled for instance by variation of the gas supply, or variation of the potential difference between the cathode and the anode or a combination thereof.

By doing that, the contents, the temperature and other properties of the plasma can be inspected and influenced during the process, which is highly desirable for obtaining a efficient and safe operation of the source.

According to a further elaboration of the method, the monitoring of the plasma through the substantially transparent housing part can be performed by at least one sensor which is provided on the cathode housing.

The electromagnetic radiation which is monitored can be in the IR, visible and/or W spectral range.

The signals obtained by monitoring the plasma can be used for an IR, optical or UV emission spectroscopy analysis for the purpose of a chemical analysis of the plasma formed in the cathode housing.

The amount of carrier gas and/or reaction gas can regulated on the basis of the data obtained by monitoring the plasma. By doing so the optimal plasma can be obtained for the process which is performed.

Further, the data obtained by monitoring the plasma can used for controlling the safety of the source, by shutting down or otherwise regulate the source when an unsafe plasma situation is observed.

Further elaborations of the invention are described in the subclaims and will now be further clarified on the basis of an exemplary embodiment, with reference to the drawings.

Figure 1:
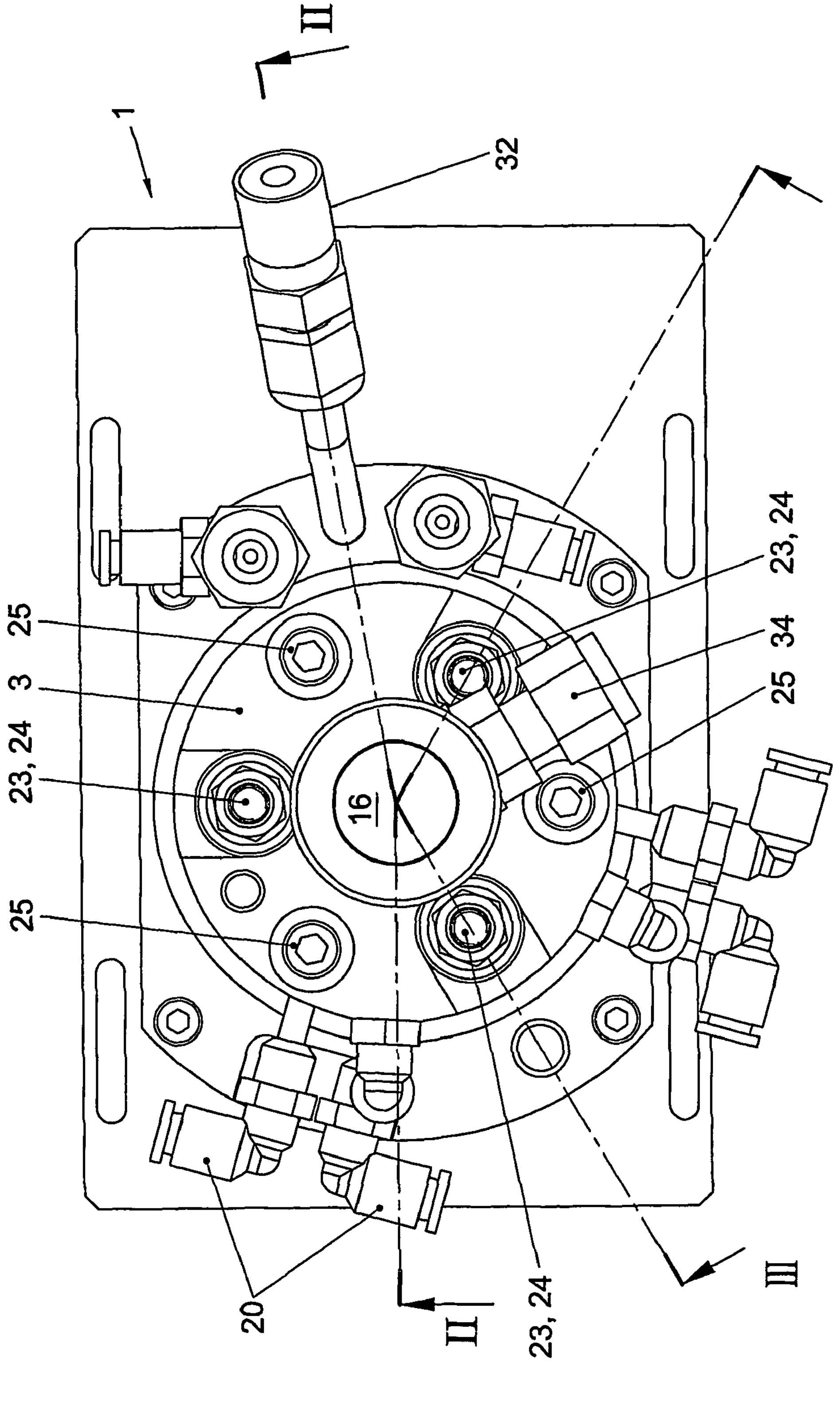
FIG. 1 shows a top plan view of an exemplary embodiment of a cascade source.
Figure 2:
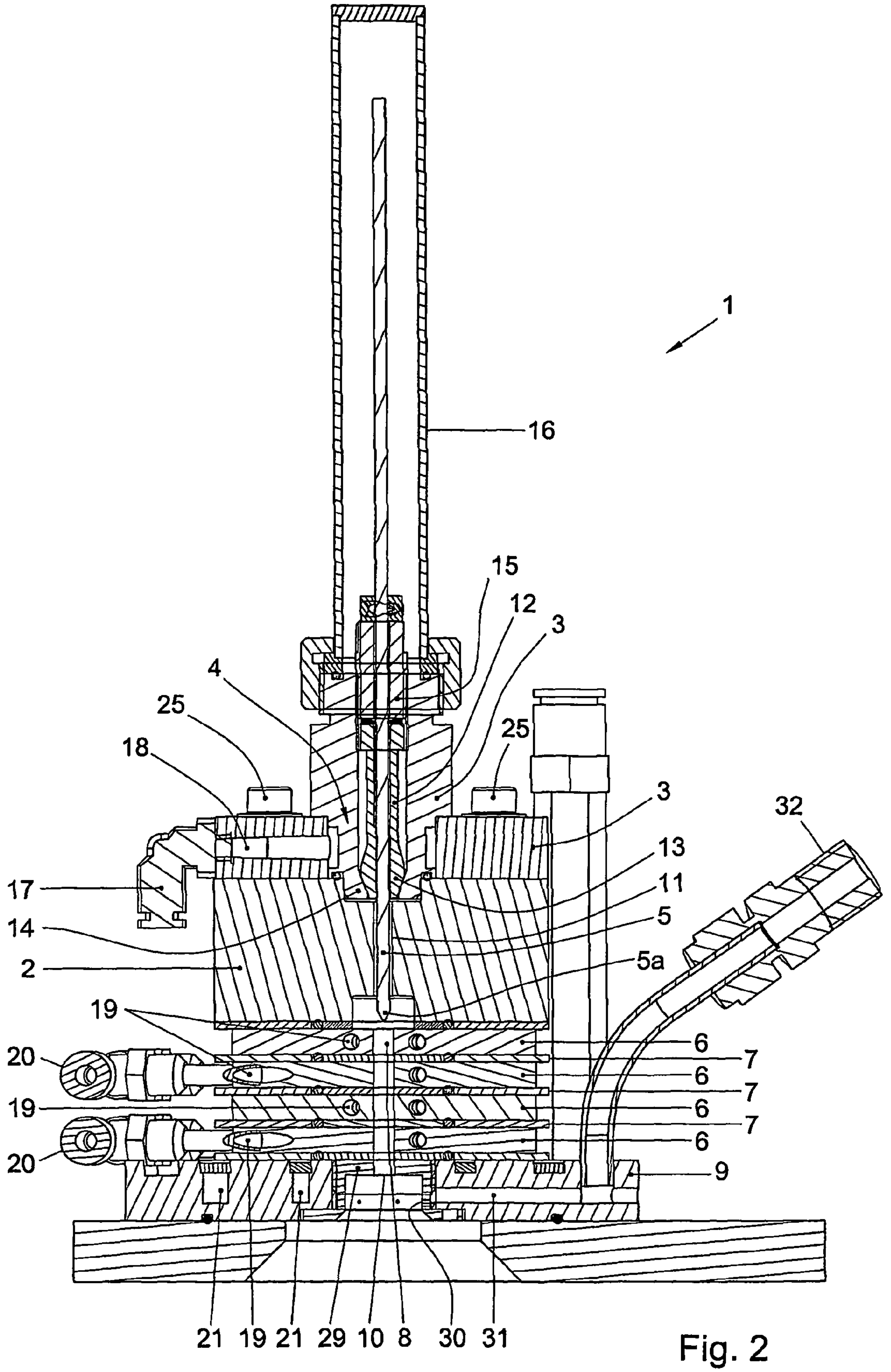
FIG. 2 shows a first cross-sectional view over line II-II from FIG. 1.
Figure 3:
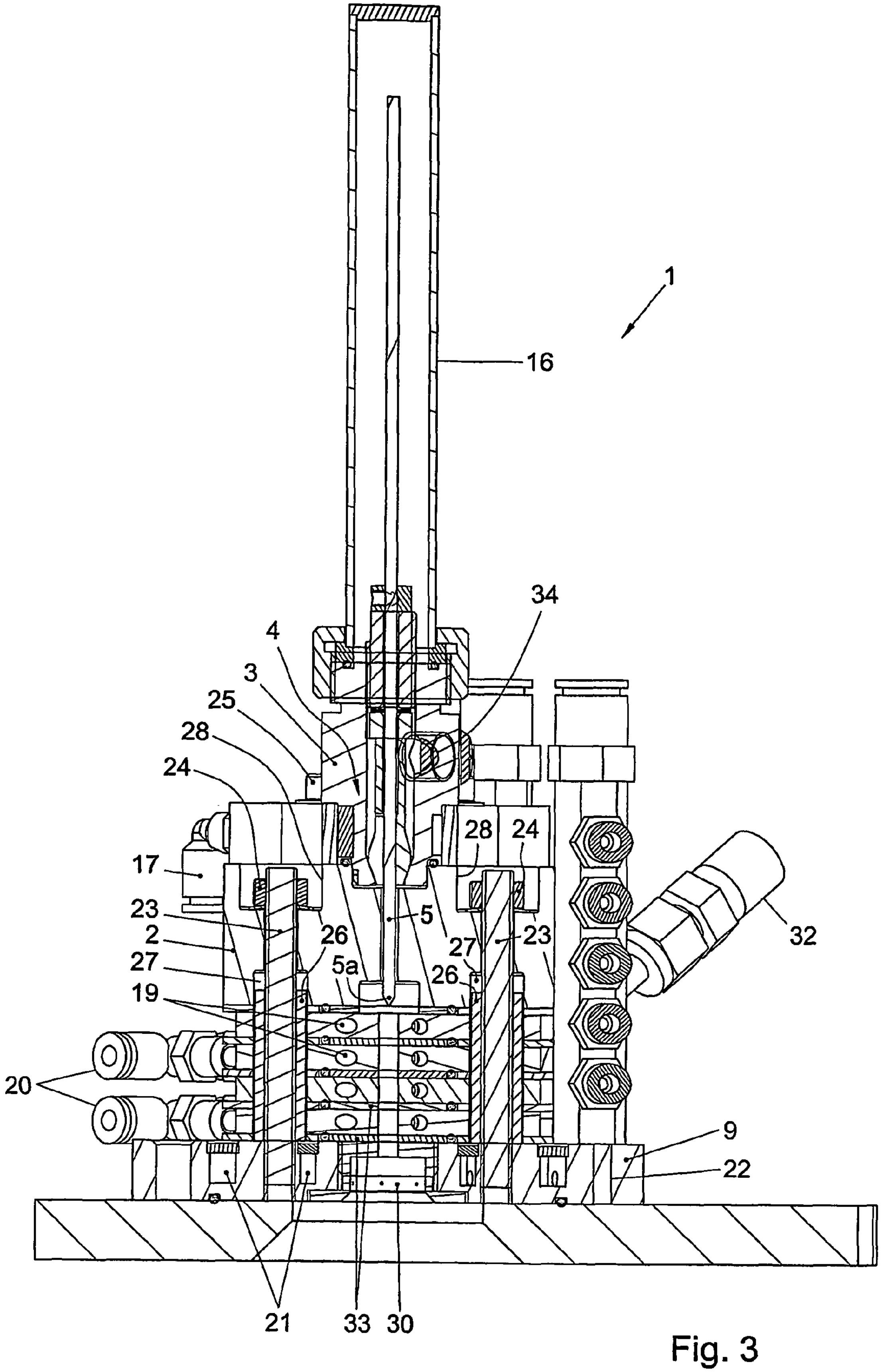
FIG. 3 shows a second cross-sectional view over line III-III from FIG. 1.

The top plan view shown in FIG. 1 of an exemplary embodiment of the cascade source clearly shows in which manner the cross-sectional views of FIGS. 2 and 3 run.

DETAILED DESCRIPTION

In the first cross-sectional view from FIG. 2, a cascade source 1 is shown which is provided with a cathode housing 2, an electrode housing 3 with a clamping provision 4 for an electrode 5. Further, cascade plates 6 are visible which are mutually electrically insulated by Teflon insulating plates 7. The cascade plates 6 and insulating plates 7 together bound a plasma channel 8. On the side of the cascade plates 6 facing away from the cathode housing 2, an anode plate 9 is arranged which is provided with an outflow opening 10 connecting to the plasma channel 8. It is noted that, also, multiple plasma channels 8 can be provided. The electrode 5 preferably is a welding electrode standard commercially available, such as for instance a TIG welding electrode. The clamping provision 4 in the electrode housing 3 is designed such that the electrode 5 is adjustable relative to the cathode housing 2 in the direction of the plasma channel 8.

In the present exemplary embodiment, the cathode housing 2 is manufactured from non-conductive material, such as for instance ceramic or quartz. It is clearly visible that the tip 5*a* of the electrode 5 is located near the bottom side of the insulating cathode housing 2. The electrode housing 3 with the clamping provision 4 is located near a top side of the insulating cathode housing. The electrode 5 extends through an electrode channel 11 extending in the insulating cathode housing 2. The diameter of the electrode channel 11 is slightly larger than the diameter of the electrode 5.

The clamping provision 4 provided in an electrode housing 3 is of the collet chuck type. For this purpose, a clamping sleeve 12 is provided which is provided with longitudinal slots and with an outer jacket with a conically tapering part 13. The conically tapering part 13 can be pressed into a cavity 14 having a corresponding conical shape. This pressure force is exerted when a retaining nut 15 is tightened. Over the electrode 5, a protective cap 16 has been placed by means of which the end of the electrode remote from the electrode tip 5*a* is protected.

The electrode housing 3 is provided with a connecting nipple 17 connecting to a cooling channel 18. Further, a gas supply connection 34 is visible in the electrode housing 3, particularly in FIG. 3. Also in the cascade plates 6, cooling channels 19 are provided with are in connection with connecting nipples 20 for cooling coils. In the anode plate 9, a cooling channel 21 is visible which is in connection with a connecting nipple 22. Further, a fluid supply ring 30 is visible which is connected to a gas supply channel 31 which is in connection with a supply nipple 32 for supply of secondary fluid in the form of liquid, gas or powder.

FIG. 3 clearly shows that the cascade plates 6 and the cathode housing 2 are mutually kept together by first attachment means 23, 24. The electrode housing 3 is connected to the cathode housing 2 via second attachment means 25. It is thus achieved that the electrode housing 3 can be taken off the cathode housing 2 with the cascade plates 6 without the mutual connection between the cascade plates 6 and the cathode housing 2 being broken. Particularly for repositioning the electrode tip, it is convenient when the electrode housing 3 can be taken off the cathode housing 2 without the mutual connections between the cascade plates 6 and of the cascade plates 6 with the cathode housing 2 being lost. This saves very much set-up time when replacing or resetting the electrode tip, which is very important, especially in a production environment.

In the present exemplary embodiment, the cascade plates 6 and the cathode housing 2 are mutually connected by threaded end/nut assemblies 23, 24 extending from the anode plate 9 to a side of the cathode housing 2 facing away from the cascade plates 6. The threaded ends are insulated by ceramic bushes 26 reaching into a recess 27 in the cathode housing 2 (see FIG. 3). As a result, the chance of a disruptive discharge taking place between the threaded ends 23—which threaded ends 23, in fact, have the potential of the anode plate 9—and one of the cascade plates 6 is minimized. FIG. 3 also clearly shows that, in a side of the cathode housing 2 facing away from the cascade plates 6, recesses 28 have been provided in which the nuts 24 of the threaded end/nut assemblies have been received. It is thus achieved that the nuts 24 and the ends of the threaded ends 23 are at a distance from the electrode housing 3, so that, also, disruptive discharge between the electrode housing 3 and the threaded end/nut assemblies 23, 24 is prevented.

According to an alternative embodiment, which is not shown here, the connection between the cascade plates and the intermediate insulating plates can have been brought about by a soldering connection instead of by clamping by threaded end/nut assemblies. This means that the cascade plates have become integral with the insulating plates. The source then comprises only the following main parts: an electrode housing, a cathode housing, a cascade stack and an anode plate. This offers the possibility, when the cascade stack is surrounded by a closed space and is provided with sufficient insulation against short-circuit, to surround the cascade stack by cooling medium, such as for instance water. In this embodiment, the insulating plates can, for instance, be manufactured from an AlO alloy. On the two flat sides, such an insulating plate can be provided with a metal layer which is solderable, for instance a molybdenum layer.

In order to prevent the copper from contaminating the processing environment, the plasma channel 8 can be wholly bounded by parts manufactured from a material which is harmless to the substrate. For the production of solar cells, these can, for instance, be molybdenum parts. In the present exemplary embodiment, only inside the insulating plates 7, molybdenum inserts 33 have been placed. Also, nozzle 29 in the anode plate 9 which bounds the outflow opening 10 is manufactured from molybdenum. In the present exemplary embodiment, the cascade plates 6 are wholly manufactured from material which is harmless to the substrate. Instead, the cascade plates 6 could also be manufactured from copper and, only at the location of the plasma channel 8, be provided with inserts which are harmless to the substrate in the manner as shown for the insulating plates 7. This latter solution has the advantage that it is actually possible to make use of the good heat-conducting properties of copper while, stills the hazard of contamination of the processing environment by copper is minimized.

FIG. 1 clearly shows that the insulating plates 7 received between the conductive cascade plates 6 have outer dimensions which are larger than the outer dimensions of the cascade plates 6. This measure also serves to prevent short-circuit between the cascade plates 6 themselves, for instance as a result of condensation forming on the outside of the cooled cascade plates. The larger insulating plates 7 prevent, at least reduce, the chance of such a short-circuit.

It is clear that the invention is not limited to the exemplary embodiment described, but that various modifications are possible within the scope of the invention as defined by the claims.

Figure 4A:
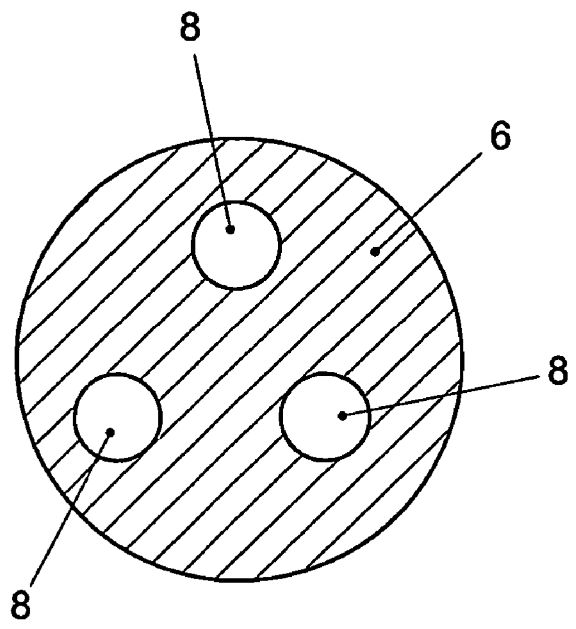
FIGS. 4*a*-4*b* show two examples of cascade plates with multiple plasma channels.
Figure 4B:
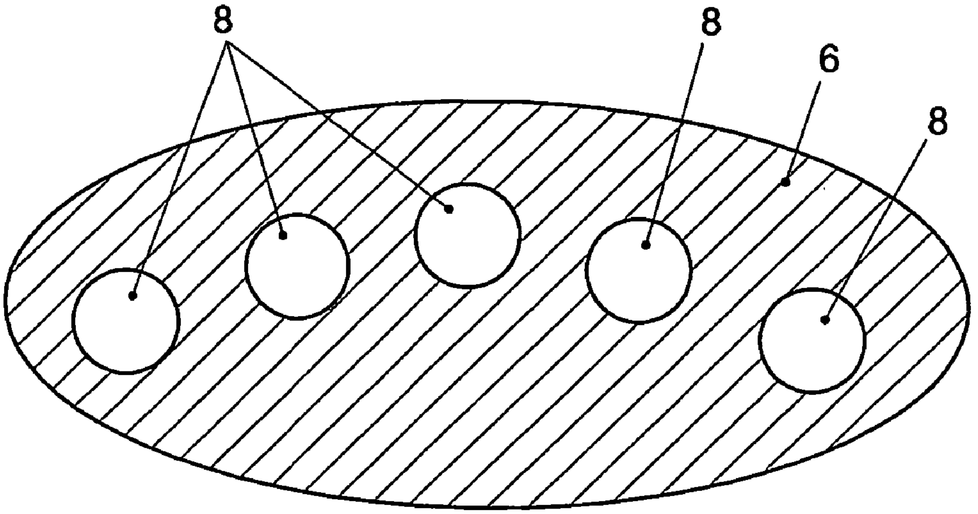

For instance, FIGS. 4*a* and 4*b* each show, in top plan view, a cascade plate 6 in which more than one plasma channel 8 extends. In such an embodiment, each plasma channel 8 has a corresponding electrode 5. Preferably, the positioning of the plasma channels 8 is matched to the shape of the substrate to be treated, such that a desired treatment of the substrate is obtained over its whole surface.

Further, at least one of the cascade plates can be provided with a gas supply channel for secondary gas. It can thus be achieved that, in a part in the source where a higher pressure still prevails, a reaction gas can be supplied to the plasma. This offers the advantage that the higher gas concentrations prevailing there achieve a more rapid reaction progress.

The invention claimed is:

1. A cascade source, comprising:

a cathode housing;

a stack of a plurality of cascade plates insulated from each other and stacked on top of each other which together bound a plasma channel extending from a first end of the stack to a second, opposite end of the stack;

an anode plate provided positioned at the first end of the stack, having an outflow opening connecting to the plasma channel; and a cathode associated with the plasma channel positioned adjacent the second end of the stack, wherein the cathode comprises an electrode which is adjustable relative to the cathode housing in the direction of the respective plasma channel.

2. The cascade source according to claim 1, wherein the electrode is a welding electrode.

3. The cascade source according to claim 1, wherein the cathode housing is connected to an electrode housing with a clamp configured to adjustably attach the electrode.

4. The cascade source according to claim 1, wherein the cathode housing is substantially manufactured from non-conductive material.

5. The cascade source according to claim 3, wherein a tip of the electrode is located near a bottom side of the cathode housing, the electrode housing with the clamp is located near a top side of the cathode housing, and the electrode extends through an electrode channel extending in the cathode housing.

6. The cascade source according to claim 5, wherein the diameter of the electrode channel is only slightly larger than the diameter of the electrode.

7. The cascade source according to claim 4, wherein the non-conductive material is ceramic.

8. The cascade source according to claim 4, wherein the non-conductive material is quartz.

9. The cascade source according to claim 1, wherein a sensor is provided on the cathode housing.

10. The cascade source according to claim 9, wherein the sensor is an optical sensor system.

11. The cascade source according to claim 9, wherein signals from the sensor are provided to a control configured to adjust a plasma forming process of the cascade source by varying a gas supply, or a potential difference between the cathode and the anode, or a combination thereof.

12. The cascade source according to claim 9, wherein the sensor is part of an apparatus configured to carrying out optical emission spectroscopy (OES) for the purpose of a chemical analysis of a plasma formed in the cathode housing.

13. The cascade source according to claim 3, wherein the clamp is of the collet chuck type.

14. The cascade source according to at least claim 3, wherein the cascade plates and the cathode housing are mutually kept together by first attachment means, the electrode housing is connected to the cathode housing by second attachment means, such that the electrode housing can be taken off the cathode housing with the cascade plates without breaking the mutual connection between the cascade plates and the cathode housing.

15. The cascade source according to at least claim 14, wherein the first attachment means comprise threaded bolt and nut assemblies extending from the anode plate to a side of the cathode housing facing away from the cascade plates, wherein the threaded bolts and/or nuts are insulated by ceramic bushes reaching into a recess in the cathode housing.

16. The cascade source according to claim 15, wherein, in a side of the cathode housing facing away from the cascade plates, recesses are provided in which the nuts are receivable such that the nuts and threaded ends of the bolts are at a distance from the electrode housing.

17. The cascade source according to claim 1, wherein the plasma channel is wholly bounded by parts manufactured from a material which is harmless to a substrate.

18. The cascade source according to claim 17, wherein the cascade plates and the anode plate with a nozzle containing the outflow opening are manufactured from the material which is harmless to the substrate.

19. The cascade source according to claim 18, wherein the cascade plates and the anode plate are manufactured from copper, and, in these plates, at the location of the plasma channel, inserts are provided which are manufactured from the material which is harmless to the substrate.

20. The cascade source according to claim 1, wherein, between the cascade plates, insulating plates are provided whose outer dimensions are larger than outer dimensions of the cascade plates.

21. The cascade source according to claim 1, further comprising a plurality of electrodes and a corresponding number of plasma channels.

22. The cascade source according to claim 21, wherein a positioning of the plasma channels is matched to the shape of the substrate to be treated, such that a desired treatment of the substrate is obtained over its whole surface.

23. The cascade source according to claim 1, wherein, in at least one of the cascade plates, a gas supply channel is provided which extends into the plasma channel.

24. The cascade source according to claim 20, wherein a connection between the cascade plates and the insulating plates is formed by a soldered connection.

25. A method for controlling a cascade source, the cascade source comprising:

a cathode housing;

a stack of a plurality of cascade plates insulated from each other and stacked on top of each other which together a plasma channel extending from a first end of the stack to a second, opposite end of the stack;

an anode plate positioned at the first end of the stack, having an outflow opening connecting to the at least one plasma channel; and a cathode associated with the plasma channel positioned adjacent the second end of the stack, wherein the cathode includes an electrode which is adjustable relative to the cathode housing in the direction of the respective plasma channel, wherein at least a part of the cathode housing is substantially transparent, the method comprising:

monitoring the electromagnetic radiation of the plasma through the substantially transparent housing part; and dependent on the monitored radiation, controlling a plasma forming process by varying a gas supply, or a potential difference between the cathode and the anode, or a combination thereof.

26. The method according to claim 25, wherein monitoring of the plasma through the substantially transparent housing part is performed by at least one sensor which is provided on the cathode housing.

27. The method according to claim 25, wherein the electromagnetic radiation which is monitored is in the IR, visible and/or UV spectral range.

28. The method according to claim 25, wherein signals obtained by monitoring the plasma are used for an IR, optical or UV emission spectroscopy analysis for the purpose of a chemical analysis of the plasma formed in the cathode housing.

29. The method according to claim 25, wherein an amount of carrier gas and/or reaction gas is regulated on the basis of the data obtained by monitoring the plasma.

30. The method according to claim 25, wherein data obtained by monitoring the plasma is used for controlling the safety of the source, by shutting down or regulating the source when an unsafe plasma situation is observed.

31. The cascade source according to claim 17, wherein the material which is harmless to the substrate to be treated by the source is molybdenum.

32. The cascade source according to claim 19, wherein the material from which the inserts are manufactured is molybdenum.

* * * * *